United States Patent
Jenkins et al.

(10) Patent No.: US 11,575,527 B2
(45) Date of Patent: Feb. 7, 2023

(54) FACILITATING SOCIAL EVENTS IN WEB CONFERENCES

(71) Applicant: INTERNATIONAL BUSINESS MACHINES CORPORATION, Armonk, NY (US)

(72) Inventors: Jana H. Jenkins, Raleigh, NC (US); John A. Lyons, Ottawa (CA); Jeffrey A. Kusnitz, Campbell, CA (US); Ilse M. Breedvelt-Schouten, Manotick (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/304,320

(22) Filed: Jun. 18, 2021

(65) Prior Publication Data
US 2022/0407731 A1    Dec. 22, 2022

(51) Int. Cl.
| | | |
|---|---|---|
| *G06F 15/16* | (2006.01) | |
| *G06F 9/54* | (2006.01) | |
| *H04L 29/06* | (2006.01) | |
| *H04L 12/18* | (2006.01) | |
| *G06F 16/9035* | (2019.01) | |
| *G06N 5/02* | (2006.01) | |
| *G06N 20/00* | (2019.01) | |
| *G06F 16/908* | (2019.01) | |

(52) U.S. Cl.
CPC ........ *H04L 12/1818* (2013.01); *G06F 16/908* (2019.01); *G06F 16/9035* (2019.01); *G06N 5/02* (2013.01); *G06N 20/00* (2019.01)

(58) Field of Classification Search
CPC ............ H04L 12/1818; G06F 16/9035; G06F 16/908; G06N 5/02; G06N 20/00
USPC ........................................................ 709/204
See application file for complete search history.

(56) References Cited

U.S. PATENT DOCUMENTS

| | | | |
|---|---|---|---|
| 6,061,716 A | 5/2000 | Moncreiff | |
| 6,559,863 B1 | 5/2003 | Megiddo | |
| 8,676,937 B2 * | 3/2014 | Rapaport | H04N 21/8358 709/219 |
| 9,634,855 B2 | 4/2017 | Poltorak | |
| 10,268,340 B2 * | 4/2019 | Chen | G06Q 10/107 |
| 10,691,726 B2 | 6/2020 | Rapaport | |

(Continued)

OTHER PUBLICATIONS

Disclosed Anonymously, "Conference Advisor System," IP.com Prior Art Database Technical Disclosure, IP.com No. IPCOM000263877D, Oct. 14, 2020, 6 pgs.

(Continued)

*Primary Examiner* — Hamza N Algibhah
(74) *Attorney, Agent, or Firm* — Elliot J. Shine (57) ABSTRACT

A method, computer system, and a computer program product for topic monitoring in web conferencing is provided. The present invention may include determining a topic profile for each of the plurality of virtual rooms. The present invention may include displaying, in a web conference user interface, the determined topic profile for each of the plurality of virtual rooms to a user. The present invention may include identifying one or more topics of interest of the user. The present invention may include recommending one or more virtual rooms to the user based on a commonality score between the one or more topics of interest of the user and the topic profile for each of the plurality of rooms.

20 Claims, 7 Drawing Sheets

(56) References Cited

U.S. PATENT DOCUMENTS

| | | | | |
|---|---|---|---|---|
| 10,819,532 | B1* | 10/2020 | van Rensburg | H04L 51/216 |
| 11,018,883 | B2* | 5/2021 | Chandran | H04L 12/1827 |
| 2010/0223335 | A1* | 9/2010 | Fu | H04L 12/1818 709/205 |
| 2010/0293104 | A1* | 11/2010 | Olsson | H04L 12/1818 707/E17.107 |
| 2012/0290950 | A1* | 11/2012 | Rapaport | H04L 67/306 715/753 |
| 2016/0364368 | A1* | 12/2016 | Chen | H04L 51/216 |
| 2019/0303838 | A1* | 10/2019 | Chung | G06F 16/908 |
| 2020/0057808 | A1* | 2/2020 | Dunne | H04L 51/046 |
| 2020/0175112 | A1* | 6/2020 | Dunne | H04L 51/216 |
| 2020/0226217 | A1* | 7/2020 | Anders | H04L 51/216 |
| 2020/0265070 | A1 | 8/2020 | Rapaport | |
| 2021/0306174 | A1* | 9/2021 | van Rensburg | H04L 51/02 |
| 2021/0337166 | A1* | 10/2021 | John | G06Q 50/01 |
| 2021/0406841 | A1* | 12/2021 | Chen | G16H 40/20 |
| 2022/0086109 | A1* | 3/2022 | Ramirez | G06F 9/453 |
| 2022/0164542 | A1* | 5/2022 | Silverstein | G06F 40/30 |

OTHER PUBLICATIONS

Disclosed Anonymously, "Method for Multiple Simultaneous Conversations During a Video Call," IP.com Prior Art Database Technical Disclosure, IP.com No. IPCOM000265035D, Feb. 19, 2021, 5 pgs.

Disclosed Anonymously, "Synthesizing a Virtual Scene Based on Participant's Social Media," IP.com Prior Art Database Technical Disclosure, IP.com No. IPCOM000262326D, May 19, 2020, 3 pgs.

Disclosed Anonymously, "System and Method for Contextual Grouping in An eMeeting," IP.com Prior Art Database Technical Disclosure, IP.com No. IPCOM000216459D, Apr. 9, 2012, 3 pgs.

Dwivedi, "NLP: Extracting the Main Topics From Your Dataset Using LDA in Minutes," TowardsDataScience.com, Aug. 22, 2018, 8 pgs., <https://towardsdatascience.com/nlp-extracting-the-main-topics-from-your-dataset-using-lda-in-minutes-21486f5aa925>.

Halu et al., "Multiplex PageRank," PLOS ONE, Oct. 2013, vol. 8, Issue 10, 10 pgs.

Harrow, et al., "Ontology Mapping for Semantically Enabled Applications," Drug Discovery Today, vol. 24, No. 10, Oct. 2019, pp. 2068-2075, <https://www.sciencedirect.com/science/article/pii/S1359644618304215>.

Howell, "Machine Learning Methods of Mapping Semantic Web Ontologies," Nov. 22, 2008, 11 pgs., <http://pages.cs.wisc.edu/~caden/projects/ML_OntologyMapping_CHowell_00.pdf>.

Humphries, "The Best Group Video Chat Apps You Probably Already Have," Review Geek, Apr. 6, 2020, Retrieved from the Internet: https://www.reviewgeek.com/38955/the-best-group-video-chats-you-prabably-already-have/, 12 pgs.

Jo, et al, "Topic Spotting on News Articles with Topic Repository by Controlled Indexing," International Conference on Intelligent Data Engineering and Automated Learning, IDEAL 2000. Lecture Notes in Computer Science, vol. 1983, Springer-Verlag Berlin Heidelberg, 2000, pp. 386-391, <https://link.springer.com/chapter/10.1007%2F3-540-44491-2_56>.

Mell et al., "The NIST Definition of Cloud Computing," National Institute of Standards and Technology, Special Publication 800-145, Sep. 2011, pp. 1-7.

Pawar, et al., "Calculating the Similarity Between Words and Sentences Using a Lexical Database and Corpus Statistics," arXiv:1802.05667v2[cs.CL], IEEE Transactions on Knowledge and Data Engineering, Feb. 20, 2018, 14 pgs., <https://arxiv.org/pdf/1802.05667.pdf>.

Semantic Arts Admin, "Semantic Ontology: The Basics," Samantics and Ontology, Apr. 8, 2019, 11 pgs., <https://www.semanticarts.com/semantic-ontology-the-basics/>.

Vimeo, "Sococo Explainer Video," Accessed: Apr. 15, 2021, Retrieved from the Internet: https://vimeo.com/265659995, 2 pgs.

* cited by examiner

FACILITATING SOCIAL EVENTS IN WEB CONFERENCES

BACKGROUND

The present invention relates generally to the field of computing, and more particularly to web conferencing.

Web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, participants may speak to and listen to audio over standard telephone lines or via computer microphones and speakers. Due to the increasing popularity of web conferencing, a user may wish to join conflicting web conferences and may be required to choose one web conference over another.

Furthermore, web conferencing may lack one or more desirable characteristics of in-person conferences, including but not limited to including, allowing people to freely switch and/or merge discussion groups and monitoring simultaneous and/or proximate discussions.

SUMMARY

Embodiments of the present invention disclose a method, computer system, and a computer program product for topic monitoring in web conferencing. The present invention may include determining a topic profile for each of the plurality of virtual rooms. The present invention may include displaying, in a web conference user interface, the determined topic profile for each of the plurality of virtual rooms to a user. The present invention may include identifying one or more topics of interest of the user. The present invention may include recommending one or more virtual rooms to the user based on a commonality score between the one or more topics of interest of the user and the topic profile for each of the plurality of rooms.

Accordingly, the present invention may improve topic monitoring across a plurality of virtual rooms by displaying, in a web conference user interface, the topic profile for each of the plurality of virtual rooms to a user.

The present invention may include adjusting, in the web conference user interface, a volume for each of the plurality of virtual rooms, wherein the volume for each of the plurality of virtual rooms is adjusted based on a commonality score between the one or more topics of interest of the user and the topic profile for each of the plurality of rooms. Accordingly, the present invention may improve topic monitoring across the plurality of virtual rooms enabling a web conference experience comparable to in-person conferences.

The present invention may include updating the topic profile for each of the plurality of virtual rooms in real time. The present invention may include determining the commonality score between the one or more topics of interest of the user and each updated topic profile of the plurality of virtual room. The present invention may include providing the user one or more recommendations. The one or more recommendations may include, but are not limited to including, virtual room mergers, volume adjustments, one or more recommended virtual rooms, amongst others. Accordingly, the present invention may enable a user to simultaneously monitor a plurality of virtual rooms. The present invention may enable the user to manually monitor the plurality of virtual rooms using a web conferencing user interface.

Additionally, the present invention may automate the monitoring process using the on the one or more topics of interest of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for topic monitoring in web conferencing. As such, the present embodiment has the capacity to improve the technical field of topic monitoring in web conferencing by enabling a user to monitor the discussions of a plurality of virtual rooms. More specifically, the present invention may include determining a topic profile for each of the plurality of virtual rooms. The present invention may include displaying, in a web conference user interface, the topic profile for each of the plurality of virtual rooms to a user. The present invention may include identifying one or more topics of interest of the user. The present invention may include recommending one or more virtual rooms to the user based on a commonality score between the one or more topics of interest of the user and the topic profile for each of the plurality of rooms.

As described previously, web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, participants may speak to and listen to audio over standard telephone lines or via computer microphones and speakers. Due to the increasing popularity of web conferencing, a user may wish to join conflicting web conferences and may be required to choose one web conference over another.

Furthermore, web conferencing may lack one or more desirable characteristics of in-person conferences, including but not limited to including, allowing people to freely switch and/or merge discussion groups and monitoring simultaneous and/or proximate discussions.

Therefore, it may be advantageous to, among other things, determine a topic profile for each of a plurality of virtual rooms, display, in a web conference user interface, the topic profile for each of the plurality of virtual rooms to a user, identify one or more topics of interest of the user, and providing one or more recommendations to the user based on a commonality score between the one or more topics of interest of the user and the topic profile for each of the plurality of virtual rooms.

According to at least one embodiment, the present invention may improve the present invention may improve topic monitoring across a plurality of virtual rooms by displaying, in a web conference user interface, the topic profile for each of the plurality of virtual rooms to a user.

According to at least one embodiment, the present invention may improve the present invention may improve topic monitoring across the plurality of virtual rooms enabling a web conference experience comparable to in-person conferences.

According to at least one embodiment, the present invention may improve topic discussions between a plurality of virtual rooms by recommending the merger of two or more virtual rooms based on the topic profiles of the two or more virtual rooms. The present invention may utilize speech recognition in generating a chat transcript for each of the plurality of virtual rooms. The chat transcripts for each of the plurality of virtual rooms may be updated in real time. Accordingly, the present invention may recommend the merger of two or virtual groups with a commonality exceeding a threshold.

According to at least one embodiment, the present invention may improve web conferencing by selecting enabling discussions of multiple virtual rooms through to the user by adjusting the volumes of the plurality of rooms based on one or more topics of interest of the user.

According to at least one embodiment, the present invention may improve the reproduction of in-person conferencing in web conferencing by adjusting the volume of discussion of the plurality of virtual rooms to replicate for a user the experience of an intimate discussion amongst a larger group discussion.

Figure 1:
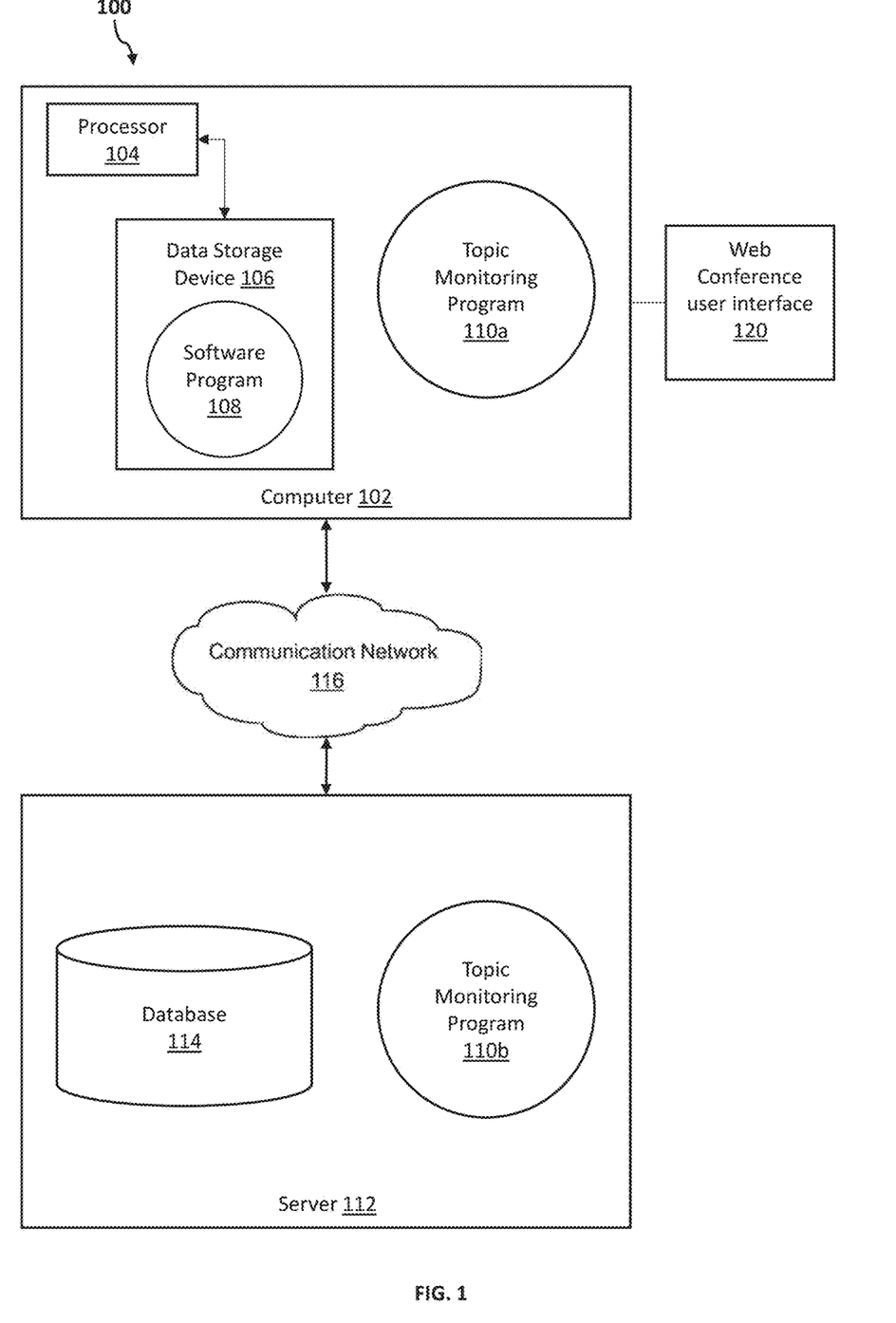
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a topic monitoring program 110a. The networked computer environment 100 may also include a server 112 that is enabled to run a topic monitoring program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the topic monitoring program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the topic monitoring program 110a, 110b (respectively) to enable personalized monitoring of a plurality of virtual rooms. In various embodiments of the invention, topic monitoring program 110, may execute locally on client computer 102 as a plug-in to an internet browser, or as a dedicated software application. In alternative embodiments, the topic monitoring program 110 may execute on server computer 112. The topic monitoring method is explained in more detail below with respect to FIGS. 2 and 3.

Figure 2:
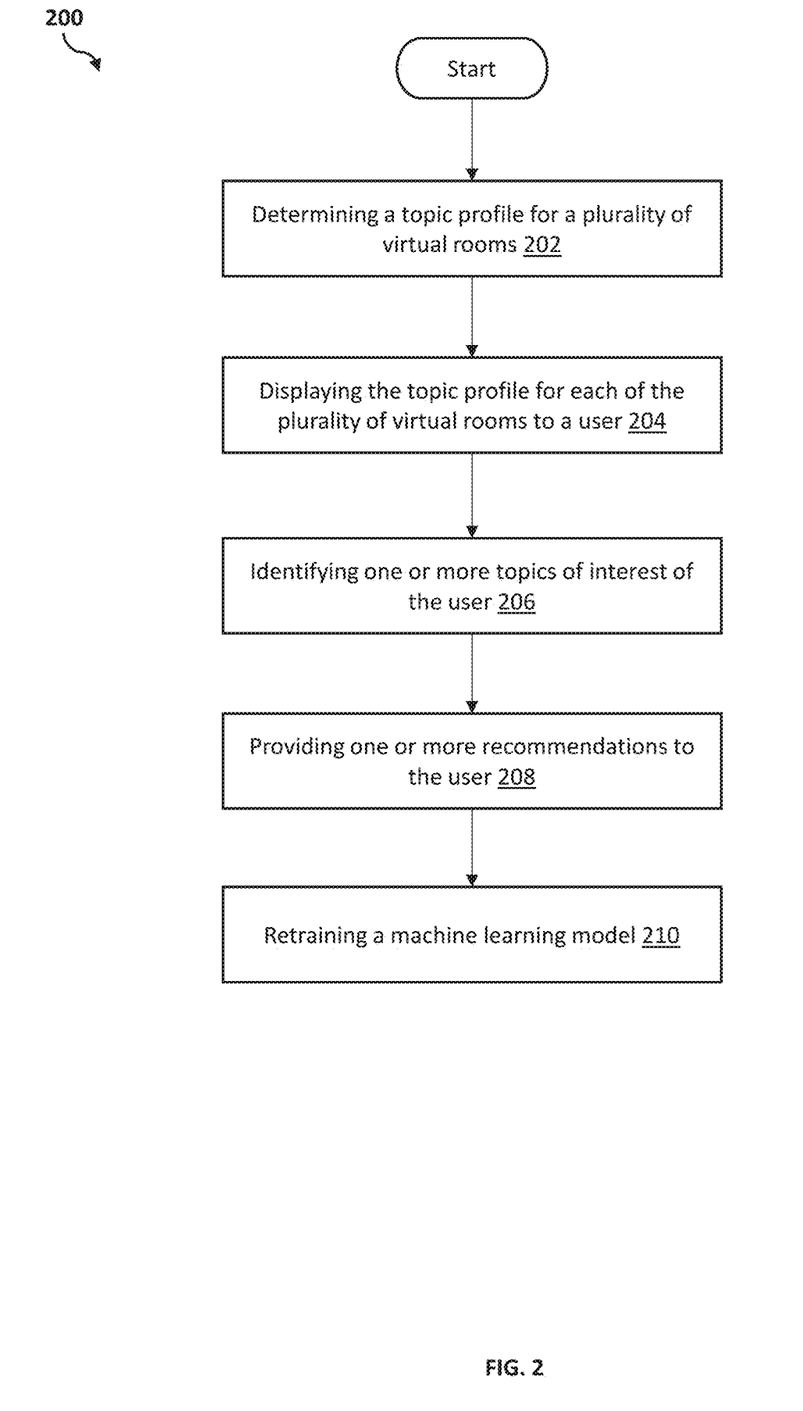
FIG. 2 is an operational flowchart illustrating a process for topic monitoring according to at least one embodiment.

Referring now to FIG. 2, an operational flowchart illustrating the exemplary topic monitoring process 200 used by the topic monitoring program 110a and 110b (hereinafter topic monitoring program 110) according to at least one embodiment is depicted.

At 202, the topic monitoring program 110 determines a topic profile for a plurality of virtual rooms. The topic monitoring program 110 may determine the topic profile for each of the plurality of virtual rooms of a web conference. The web conference may be a virtual and/or hybrid event comprised of a plurality of virtual rooms (e.g., channels) in which users (e.g., participants, attendees, speakers) engage in discussions on one or more topics. As will be explained in more detail below, the topic profile may be comprised of at least entities, keywords, and concepts extracted from each chat transcript for the plurality of virtual rooms.

The topic profile may correspond to the discussion of a virtual room, including information such as, but not limited to, high-level concepts being discussed and a corresponding speaker. The topic profile may be updated in real time as the discussion of a virtual room progresses. The topic monitoring program 110 may utilize one or more linguistic techniques in determining the topic profile for the plurality of virtual rooms. The topic monitoring program 110 may utilize linguistic techniques such as, but not limited to, a machine learning model with Natural Language Processing (NLP), speech-to-text, Hidden markov models (HMM), N-grams, Speaker Diarization (SD), Semantic Textual Similarity (STS), Keyword Extraction, amongst other linguistic techniques, such as those implemented in IBM Watson® (IBM Watson and all Watson-based trademarks are trademarks or registered trademarks of International Business Machines Corporation in the United States, and/or other countries), IBM Watson® Speech to Text, IBM Watson® Tone Analyzer, IBM Watson® Natural Language Understanding, IBM Watson® Natural Language Classifier, in determining the topic profile for each of the plurality of virtual rooms.

The topic monitoring program 110 may utilize the one or more linguistic techniques to transcribe speech from each of the plurality of virtual rooms. The topic monitoring program 110 may generate a chat transcript for each of the plurality of virtual rooms. The chat transcript for each of the plurality of virtual rooms may be updated in real time. The chat transcript may be displayed, in the web conference interface 120, by the topic monitoring program 110. The topic monitoring program 110 may display updates to the chat transcript to the user in real time. The topic monitoring program 110 may display the chat transcript for each of the plurality of virtual rooms to a user. The chat transcript may be searchable. The topic monitoring program 110 may also utilize the one or more linguistic techniques in labeling the chat transcript for each of the plurality of virtual rooms. Labeling may include, but is not limited to including, speaker (e.g., participant, attendee, user) identification for associated text in the chat transcript.

The number of the plurality of virtual rooms (e.g., channels) may dynamically change throughout the web conference. The initial number of the plurality of virtual rooms (e.g., channels) may be set in advance and may be manually labeled with topics of discussion. The one or more users may initiate new virtual rooms (e.g., channels) and manually label the topics of discussion.

The topic monitoring program 110 may further utilize the one or more linguistic techniques, such as, but not limited to, IBM Watson® Natural Language Understanding (IBM Watson and all Watson-based trademarks are trademarks or registered trademarks of International Business Machines Corporation in the United States, and/or other countries), IBM Watson® Natural Language Classifier, keyword extraction, speech recognition, amongst other linguistic techniques in performing a text analysis of the chat transcript for each of the plurality of virtual rooms. The topic monitoring program 110 may extract at least, but not limited to, entities, keywords, concepts, relations, categories, classifications, metadata, semantic roles, sentiment, and/or syntax from the chat transcript for each of the plurality of virtual rooms.

If one or more of the plurality of virtual rooms has been manually labeled with topics of discussion, then the topic monitoring program 110 may utilize the one or more topics manually labeled in determining a relevance score for the keywords extracted, determining a confidence score for the entities extracted, and scoring the concepts extracted.

The topic monitoring program 110 may utilize at least the entities, keywords, and concepts extracted from each chat transcript in determining the topic profile for each of the plurality of virtual rooms. Entities may be people, places, events, companies, organizations, and/or other types of entities mentioned in the chat transcript, may be categorized by type, and may be assigned a confidence score by the topic monitoring program 110. Keywords may be words and/or concepts of significance and may be assigned a relevance score by the topic monitoring program 110. Concepts may be high-level concepts that may not necessarily be directly referenced in the content. For example, the topic monitoring program 110 may extract the concept, "Artificial Intelligence" from the chat transcript of a virtual room discussing deep learning although the term is not mentioned. The topic profile for each of the plurality of virtual rooms may dynamically change as the discussion within each of the plurality of virtual rooms changes. The topic monitoring program 110 may utilize the new text of the chat transcript to update the topic profile for each of the plurality of virtual rooms in real time by continuing to perform the one or more linguistic techniques described above on the new text. As will be explained in more detail below with respect to Step 208, the topic monitoring program 110 may store the context by which the entities, keywords, and concepts appear and/or are introduced in the chat transcript in a knowledge corpus (e.g., database 114). The context may be utilized in accurately mapping each topic profile to an ontology cluster.

For example, Users A, B, C, D, E, and F may be in Virtual Room A discussing Topic A. Users A, B, and C, may initiate a new Virtual Room B to discuss a specific use case with respect to Topic A. Users A, B, and C may manually label the new Virtual Room B with Topic A. The topic monitoring program 110 may utilize the one or more linguistic techniques described above to transcribe speech from both the Virtual Room A and the Virtual Room B and extract at least the entities, keywords, and concepts from both the chat transcript of Virtual Room A and the chat transcript of Virtual Room B. The topic monitoring program 110 may then determine the topic profile for both Virtual Room A and Virtual Room B. The topic profile for both Virtual Room A and Virtual Room B may be presented to a user through a web conference interface 120. Prior to the topic monitoring program 110 identifying the one or more topics of interest of the user, as will be explained below, the user may hear conversations in both Virtual Room A and Virtual Room B and enter either virtual room and/or adjust the volume of the discussion in each virtual room.

At 204, the topic monitoring program 110 displays the topic profile for each of the plurality of virtual rooms to a user. The topic monitoring program 110 may display the topic profile for each of the plurality of virtual rooms to the user (e.g., participant, attendee, speaker) of the web conference using a web conference user interface 120. The web conference user interface 120 may be displayed by the topic monitoring program 110 in at least an internet browser, dedicated software application, or as an integration with a third party software application, amongst other mediums.

In an embodiment, the topic monitoring program 110 may enable, through the web conference user interface 120, the user to at least listen to discussions of each of the plurality of virtual rooms, access the chat transcripts of each of the plurality of virtual rooms, join a virtual room, request a merger of two or more of the plurality of virtual rooms, display a topic profile for each of the one or more virtual rooms, identify the users (e.g., participants, attendees, speakers) of a virtual room, adjust the volume of discussions for each of the plurality of virtual rooms, amongst other features. The topic monitoring program 110, through the web conferencing user interface 120, may enable a user to monitor two or more virtual rooms simultaneously. As will be explained in more detail below, the topic monitoring program 110, through the web conference user interface 120, may automatically adjust volumes in of discussions in the plurality of virtual rooms based on identified topics of interest of the user. The topic monitoring program 110 may also recommend one or more virtual rooms to a user, display the one or more virtual rooms to a user, present the chat transcripts of one or more virtual rooms to the user, amongst other features.

Continuing with the above example, User G may join the web conference using the web conference software user interface 120. The topic monitoring program 110 may display the topic profile, discussed previously with respect to 202 above, for each of the plurality of virtual rooms to User G utilizing the web conference user interface 120. User G may simultaneously listen in on both the discussion of Virtual Room A and the discussion of Virtual Room B based on an initial volume for each of the virtual rooms established by the topic monitoring program. User G may also be able to access the chat transcript for both Virtual Room A and Virtual Room B. User G may choose to join Virtual Room A while monitoring the chat transcript and discussion of Virtual Room B. Such that the Volume of Virtual Room A may be 90% and the volume of Virtual Room B may be 10%. User G may hear a topic of interest being discussed in Virtual Room B and adjust the volume of Virtual Room B to 70%. Accordingly, the topic monitoring program 110 may adjust the volume of Virtual Room A to 30%.

At 206, the topic monitoring program 110 identifies one or more topics of interest of the user. The one or more topics of interest may be identified from a plurality of user information. The plurality of user information may include, but is not limited to including, manual input from the user with respect to topics of interest and/or speakers of interest, current job role, desired job role, educational background, unstructured and/or structured feedback received from the user on previous web conferences, manual input received from the user, previously completed web conferences, level of participation in previous web conferences, topic profiles of virtual rooms in which the user participated, amongst other user information.

The topic monitoring program 110 may utilize the one or more linguistic techniques in analyzing the plurality of user information. For example, the topic monitoring program 110 may utilize Semantic Textual Similarity (STS) to identify one or more topics of interest from the topics of interest included in the plurality of user information. For example, the user may input "Biology" as a topic of interest. The topic monitoring program 110, utilizing SMS, may identify additional topics of interests such as marine biology, microbiology, and molecular biology.

The topic monitoring program 110 may also receive a plurality of user information through the web conference user interface 120. For example, the user may access the web conference user interface 120 through a plug-in to an internet browser whereby the topic monitoring program 110 executes locally on client computer 102. The topic monitoring program 110 may display, in the web conference user interface 120, the topic profile for each of the plurality of virtual rooms of one or more web conferences to the user. The user may utilize a search tab to manually input the one or more topics of interest and the topic monitoring program 110 may recommend one or more virtual rooms to the user based on a commonality between the one or more topics of interests entered by the user and the topic profile for each of the plurality of virtual rooms. The commonality between the one or more topics of interest and the topic profile for each of the plurality of virtual rooms may be determined from an ontology perspective. For example, Machine Learning and Natural Language Processing may both be categorized within Artificial Intelligence, but may be further categorized between different subclassifications of the Artificial Intelligence classification.

The plurality of user information may be stored by the topic monitoring program 110 in a knowledge corpus (e.g., database 114) and a personal knowledge corpus (e.g., personal database which has the same capabilities as database 114). The knowledge corpus (e.g., database 114) may be utilized by the topic monitoring program in storing the plurality of user information for all users. The personal knowledge corpus (e.g., personal database) may be utilized in storing the plurality of user information specific to each user. As will be explained in more detail below, the knowledge corpus and personal knowledge corpus may be utilized to at least, improve the identification of topics of interest of users, train the machine learning model, identifying similar and/or semantically similar terms in both chat transcripts and/or topic profiles, store context of topic profiles for ontological mapping, amongst other utilizations.

The topic monitoring program 110 may receive permission from the user and/or the host of the web conference prior to utilizing the plurality user information in identifying the one or more topics of interest and/or prior to storing the plurality of user information in the knowledge corpus (e.g., database 114) and/or the personal knowledge corpus (e.g., personal database).

At 208, the topic monitoring program 110 provides one or more recommendations to the user. The topic monitoring program 110 may recommend the one or more virtual rooms to the user based on a commonality between the one or more topics of interest of the user and the topic profile for each of the plurality of virtual rooms. The topic monitoring program 110 may determine the commonality between the one or more topics of interest and the topic profile using a commonality score. The commonality score between the one or more topics of interest and the topic profile for each of the plurality of virtual rooms may be determined using a machine learning model.

The topic monitoring program 110 may identify matches between the one or more topics of interest and the topic profiles for each of the plurality of virtual rooms based on the commonality score between a topic of interest and a topic profile exceeding a commonality threshold. The machine learning model with Natural Language Processing (NLP) may utilize one or more word vectorization techniques in mapping at least each of the one or more topics of interest and each of the topic profiles to a hierarchical ontology. The machine learning model may determine a shortest path distance within the hierarchical structure between each of the one or more topics of interest and each of the topic profiles. The shortest path distance may be a numerical value utilized by the machine learning model in determining the commonality score between each of the one or more topics of interest of the user and the topic profile for each of the plurality of virtual rooms. The machine learning model may determine the commonality score between each of the one or more topics of interest of the user and each topic profile of the plurality of virtual rooms using at least the shortest path distance within the hierarchical structure weighted according to the user information.

The machine learning model may leverage user information stored in the knowledge corpus (e.g., database 114) in determining the commonality score. The machine learning model may weight the identified matches using the user information. For example, the user may have Current Job Role A and Desired Job Role B. The machine learning model may weight unstructured and/or structured feedback of other users with Current Job Role A and Desired Job Role B in determine the commonality score between the one or more topics of interest of the user and the topic profiles for each of the plurality of virtual rooms.

The commonality score between each of the one or more topics of interested of the user and the topic profile for each of the plurality of virtual rooms may be ranked. The topic monitoring program 110 may utilize the rankings in recommending one or more virtual rooms to the user. The topic monitoring program 110 may recommend the one or more virtual rooms to the user where the commonality score exceeds a commonality threshold. The commonality threshold may be a predetermined commonality score value, the predetermined commonality score value may differ depending on the topic of interest. The topic monitoring program 110 may display the one or more virtual rooms recommended to user utilizing one or more methods. The topic monitoring program 110 may display the one or more virtual rooms recommended to the user in order of commonality in the web conference user interface 120 (e.g., with virtual rooms with a highest degrees of commonality based on the analysis described previously with respect to steps 206 and 208 above being recommended first). The topic monitoring program 110 may highlight the one or more virtual rooms recommended to the user in the web conference user interface 120.

The one or more recommendations provided by the topic monitoring program 110 may also include, but are not limited to including, automatic volume adjustments for the plurality of virtual rooms, recommended volume adjustments for the plurality of virtual rooms, merging two or more virtual rooms, virtual room changes, amongst other recommendations. The one or more recommendations may be provided by the topic monitoring program 110 through the web conference user interface 120.

The topic monitoring program 110 may also utilize the new text of the chat transcript to update the topic profile for each of the plurality of virtual rooms in real time. Accordingly, the machine learning model may update the determined commonality score between the one or more topics of interest of the user and the topic profile for each of the plurality of virtual rooms. The machine learning model may weight updates to the topic profile such that the most recent topics of discussion within a virtual room have a greater influence on the commonality score. The topic monitoring program 110 may provide the user one or more recommendations based on the commonality score update. The topic monitoring program 110 may utilize one or more methods in providing the recommendations to the user. The topic monitoring program 110 may utilize the web conference user interface 120 to send the user notifications, messages, alerts, amongst other methods in providing the recommendations to the user.

The topic monitoring program 110 may adjust, in the web conference user interface 120, a volume of the discussion for each of the plurality of virtual rooms. The topic monitoring program 110 may adjust the volume of the discussion for each of the plurality of virtual rooms based on the commonality score between the one or more topics of interest of the user and the topic profile for each of the plurality of virtual rooms. In an embodiment, the topic monitoring program 110 may automatically adjust the volume of the discussion for each of the plurality of rooms based on the commonality score determined. In an embodiment, the topic monitoring program 110 may adjust the volume such that the each of the plurality of virtual rooms below the commonality threshold is muted and the plurality of virtual rooms above the commonality threshold has the volume adjusted according to commonality score. The topic monitoring program 110 may continuously adjust the volume for each of the plurality of virtual rooms according to commonality score updates.

For example, the web conference may be comprised of Virtual Rooms A, B, C, D, and E. The topic monitoring program 110 may determine based on the commonality score between the one or more topics of interest of the user and the topic profile for each of the plurality of virtual rooms that Virtual Room A and Virtual Room C exceed the commonality threshold. The topic monitoring program 110 may mute Virtual Room B, Virtual Room D, and Virtual Room E for falling below the commonality threshold. Virtual Room A may be ranked higher with respect to commonality score relative to Virtual Room B. Accordingly, the topic monitoring program 110 may adjust the volume of the discussion for Virtual Room A to 80% and the volume of the discussion for Virtual Room B to 20%. The user may manually adjust the discussion volume for Virtual Room A to 10% and Virtual Room B to 90%. The topic monitoring program 110 may store this activity of the user in the personal knowledge corpus (e.g., personal database) and retrain the machine learning model based on this activity, as will be explained in more detail with respect to Step 210.

In an embodiment, the topic monitoring program 110 may recommend merging two or more virtual rooms to the user and/or all the users of the two or more virtual rooms based on a commonality overlap between the plurality of virtual rooms, commonality overlap between users of the two or more virtual rooms, access restrictions for the two or more rooms, and/or administrative approval. Access restrictions may exist between virtual rooms of different web conferences and/or between a private virtual room and a public virtual room. Administrative approval may require approval of the merging between two or more virtual rooms by a specific user and/or a majority of users. For example, as commonality of topic profiles between two or more virtual rooms reach a commonality overlap threshold, the topic monitoring program 110 may recommend merging of the two or more virtual rooms. The commonality overlap between two or more virtual rooms may be determined by the topic monitoring program 110 utilizing a machine learning model by mapping the topic profile for each of the plurality of rooms and weighting the user information of each of the users participating in the virtual room, as outlined above. The commonality overlap threshold may be higher than the commonality threshold between the one or more topics and topic profiles of the plurality of virtual rooms.

In an embodiment, the topic monitoring program 110 may recommend a new virtual room to the user. The new virtual room may be one of the plurality of virtual rooms and/or a virtual room initiated following the commonality determination for the plurality of virtual rooms (e.g., described previously with respect to steps 206 and 208 above). The topic monitoring program 110 may recommend the new virtual room to the user based on the updated commonality score between the one or more topics of interest of the user and the topic profile of the new virtual room. The topic profile for each of the plurality of virtual rooms may dynamically change as the discussion within each of the plurality of virtual rooms changes. Continuing with the above example, the topic profile of Virtual Room C may change such that the commonality score between the topic profile of Virtual Room C and the one or more topics of interest of the user is higher than both Virtual Room A and Virtual Room B. The topic monitoring program may automatically adjust the volume of the discussion for Virtual Room C to alert the user. Alternatively, in the web conference user interface 120, the user may be sent a notification with respect to Virtual Room C. The notification may display the change in topic profile for Virtual Room C to the user.

At 210, the topic monitoring program 110 retrains the machine learning model. The topic monitoring program 110 may retrain the machine learning model based on user activity and/or user feedback. The topic monitoring program 110 may store the user activity and/or user feedback in the personal knowledge corpus (e.g., personal database).

User activity and/or user feedback may include, but is not limited to including, adjustments of virtual room volumes, user participation in the virtual rooms such as speaking and/or chat discussions, leaving a virtual room, joining a virtual room, time spent in a virtual room, unstructured and/or structured feedback, amongst other user activity and/or user feedback.

The topic monitoring program 110 may utilize the one or more linguistic techniques in retraining the machine learning model based on the user activity and/or user feedback. For example, the topic monitoring program 110 may extract the sentiment and/or emotion for user participation in the virtual rooms.

Figure 3A:
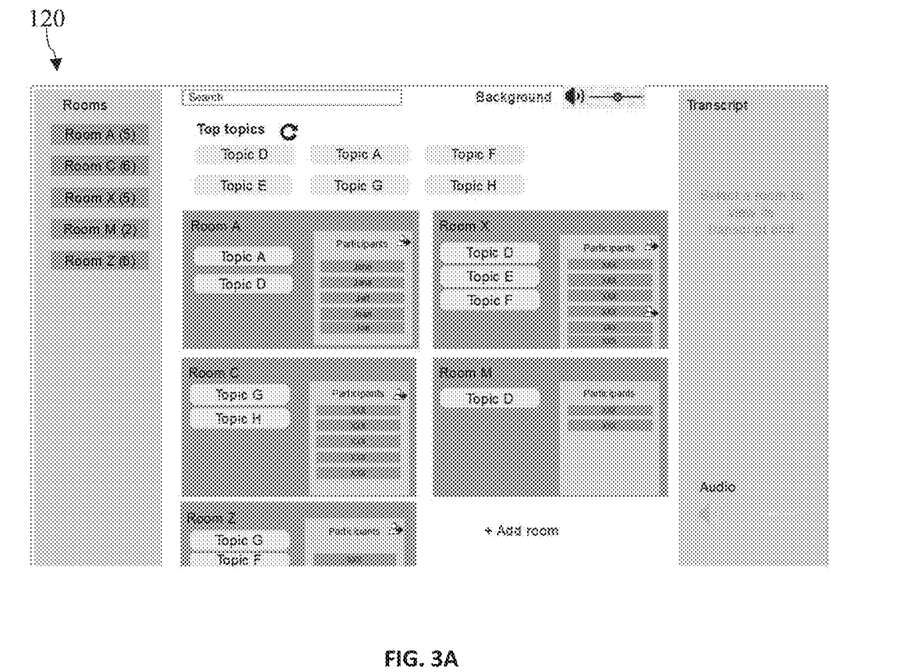
FIG. 3A is an exemplary illustration for displaying the topic profile for each of the plurality of virtual rooms to a user in the web conference user interface.

Referring now to FIG. 3A, an exemplary illustration for displaying the topic profile for each of the plurality of virtual rooms to a user in the web conference user interface 120 is depicted. FIG. 3A may depict the web conference user interface 120 first presented to the user, including the display of the one or more topic profiles of each of the plurality of rooms.

The plurality of virtual rooms depicted are Room A, C, X, M, and Z with the number of users in each virtual room depicted in parentheses. The topic profile for Room A is Topic A and D. The topic profile for Room X is Topic D, E, and F. The topic profile for Room C is Topic G and H. The topic profile for Room M is Topic D. The topic profile for Room Z is Topic G and F. In this illustration, the user has not entered a room and can hear the discussions of Rooms A, X, C, M, and Z simultaneously, see background noise adjustment.

Figure 3B:
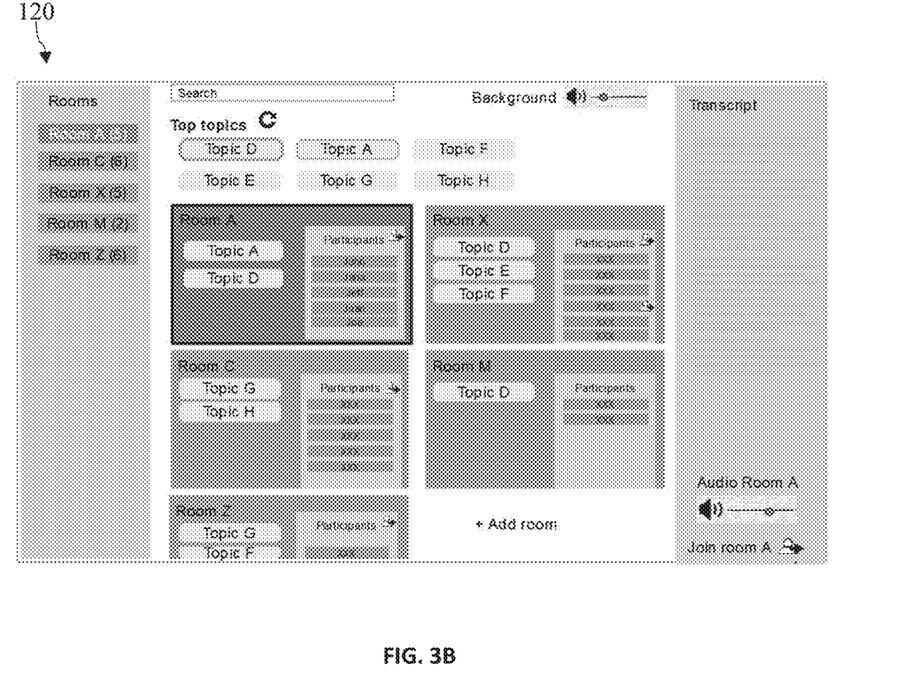
FIG. 3B is an exemplary illustration of displaying one or more recommended virtual rooms to a user in the web conference user interface.

Referring now to FIG. 3B, an exemplary illustration of displaying one or more recommended virtual rooms to a user in the web conference user interface 120 is depicted. In this illustration, the topic monitoring program 110 has identified Topic D as a topic of interest to the user and displayed the recommendation of Room A. Here, the volume of Room A has been increased and the background volume of the plurality of other virtual rooms has been decreased, which may allow the user to focus on and participate in Room A while simultaneously monitoring Room X, C, M, and Z.

Figure 3C:
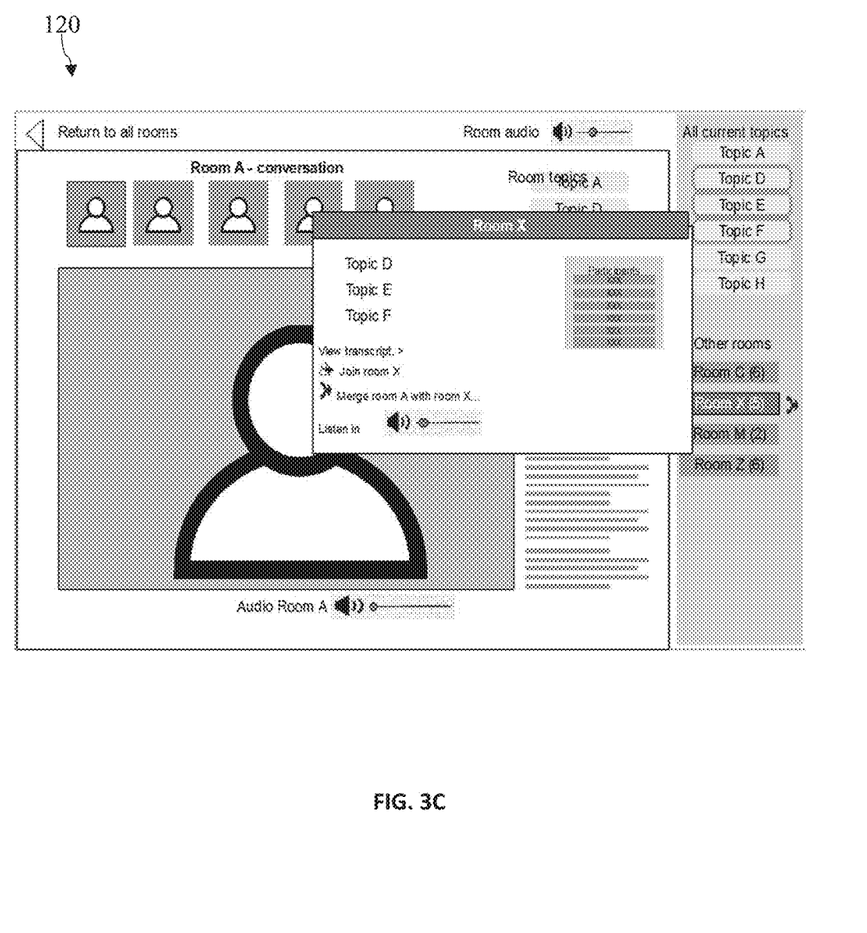
FIG. 3C is an exemplary illustration of a user monitoring the plurality of virtual rooms in the web conference user interface.

Referring now to FIG. 3C, an exemplary illustration of a user monitoring the plurality of virtual rooms in the web conference user interface 120 is depicted. In this illustration, the user has joined Room A and is simultaneously monitoring Room X with the ability to adjust the volume of Room Z, monitor the topic profile of Room X, view the chat transcript of Room X, join Room X, and/or Merge Room A with Room X.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
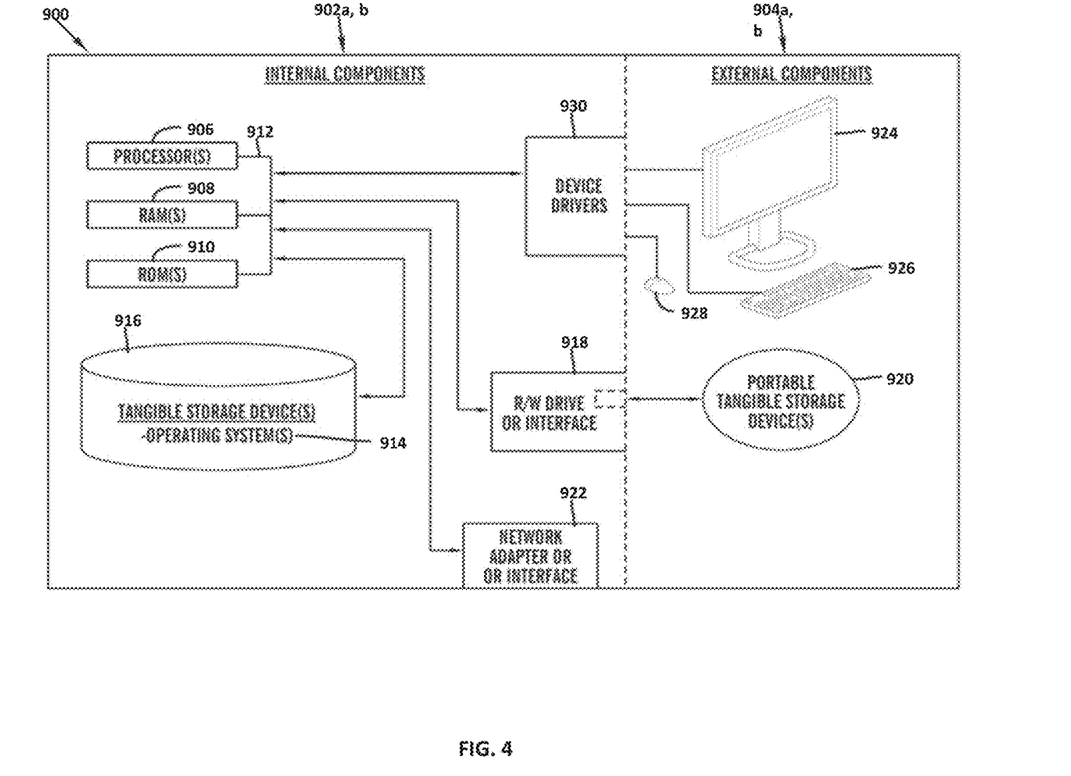
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the topic monitoring program 110a in client computer 102, and the topic monitoring program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the topic monitoring program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the topic monitoring program 110a in client computer 102 and the topic monitoring program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the topic monitoring program 110a in client computer 102 and the topic monitoring program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
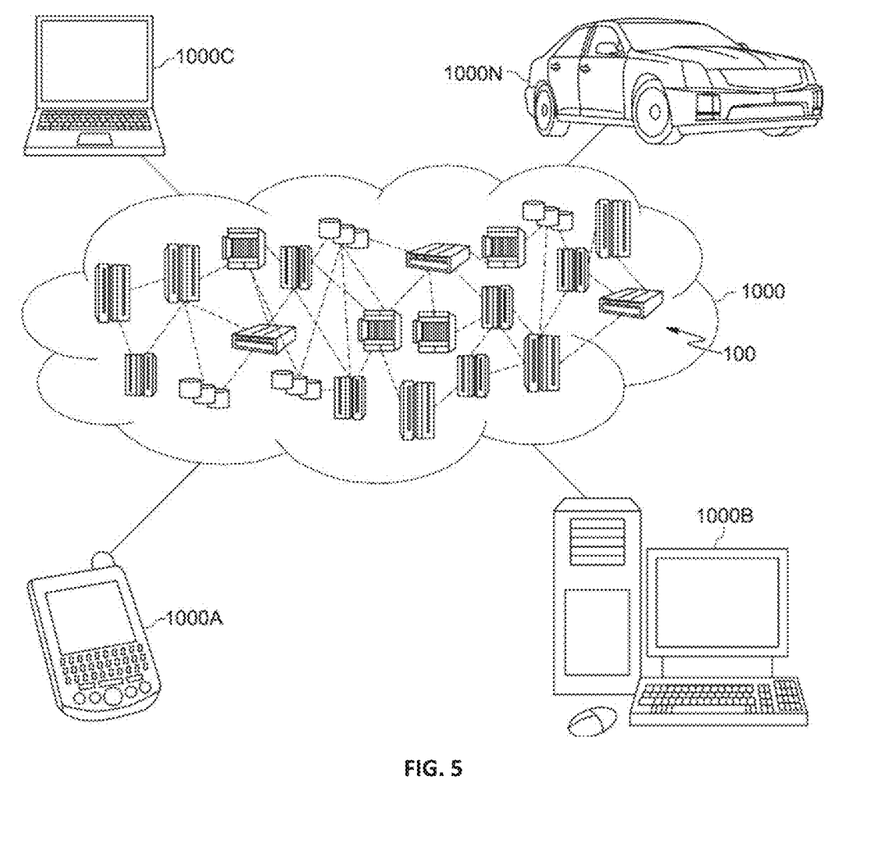
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
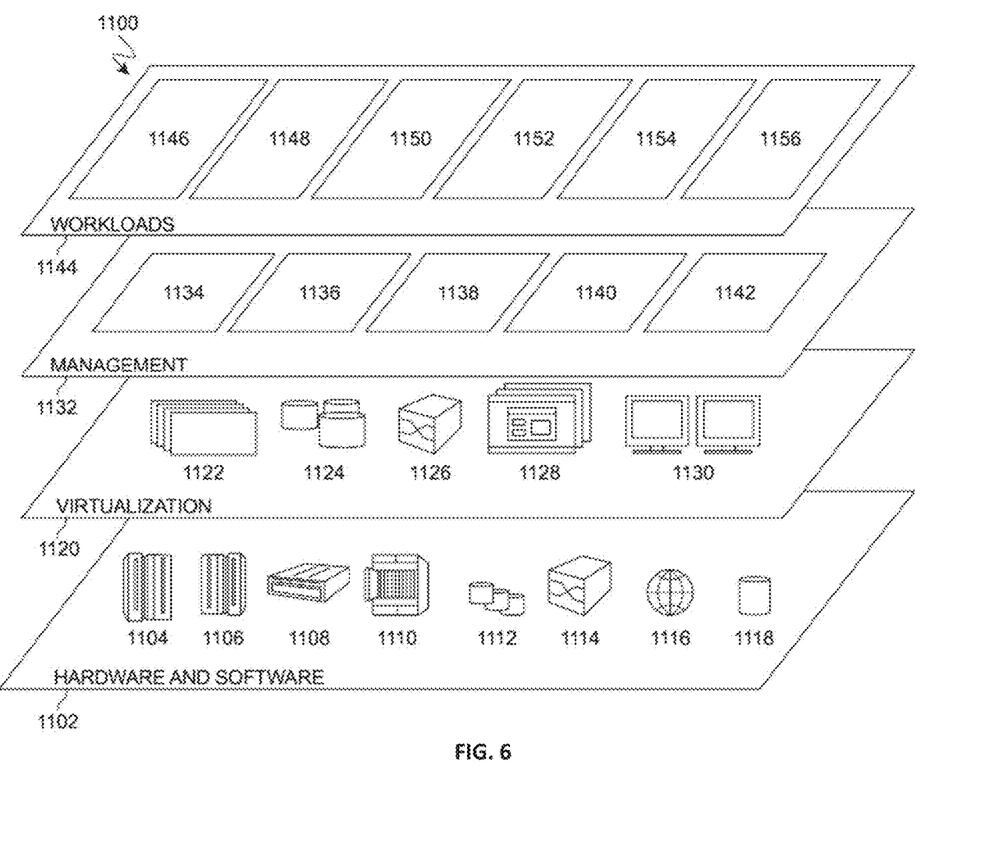
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and topic monitoring 1156. A topic monitoring program 110a, 110b provides a way to intelligently monitor the discussions of a plurality of virtual rooms.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for topic monitoring, the method comprising:
determining a topic profile for each of a plurality of virtual rooms;
displaying, in a web conference user interface, the determined topic profile for each of the plurality of virtual rooms to a user;
identifying one or more topics of interest of the user; and
adjusting, in the web conference user interface, a volume for each of the plurality of virtual rooms, wherein the volume for each of the plurality of virtual rooms is adjusted based on a commonality score between the one or more topics of interest of the user and the topic profile for each of the plurality of virtual rooms.

2. The method of claim 1, wherein the topic profile for each of the plurality of virtual rooms is determined using at least entities, keywords, and concepts extracted from a chat transcript for each of the plurality of virtual rooms; and wherein the chat transcript for each of the plurality of virtual rooms is displayed to the user in the web conference user interface.

3. The method of claim 1, wherein the volume for each of the plurality of virtual rooms below a commonality threshold is muted and the volume for each of the plurality of rooms above the commonality threshold is adjusted according to the commonality score.

4. The method of claim 1, wherein providing one or more recommendations to the user further comprises:
displaying, in the web conference user interface, one or more virtual rooms recommended to the user.

5. The method of claim 1, wherein the commonality score between the one or more topics of interest and the topic profile for each of the plurality of virtual rooms is determined using a machine learning model.

6. The method of claim 5, further comprising:
retraining the machine learning model based on user activity, the user activity being stored in a personal knowledge corpus.

7. The method of claim 1, further comprising:
updating the topic profile for each of the plurality of virtual rooms in real time;
updating the commonality score between the one or more topics of interest of the user and each updated topic profile for the plurality of virtual rooms; and
providing the user one or more recommendations based on the commonality score update.

8. The method of claim 1, further comprising:
determining a commonality overlap between the plurality of virtual rooms;
recommending to the user a merger of at least two or more virtual rooms, wherein the at least two or virtual rooms exceed a commonality overlap threshold; and
merging the two or more virtual rooms.

9. The method of claim 1, further comprising:
providing one or more recommendations to the user based on a commonality score between the one or more topics of interest of the user and the topic profile for each of the plurality of virtual rooms.

10. A computer system for topic monitoring, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining a topic profile for each of a plurality of virtual rooms;
displaying, in a web conference user interface, the determined topic profile for each of the plurality of virtual rooms to a user;
identifying one or more topics of interest of the user; and
adjusting, in the web conference user interface, a volume for each of the plurality of virtual rooms, wherein the volume for each of the plurality of virtual rooms is adjusted based on a commonality score between the one or more topics of interest of the user and the topic profile for each of the plurality of virtual rooms.

11. The computer system of claim 10, wherein the topic profile for each of the plurality of virtual rooms is determined using at least entities, keywords, and concepts extracted from a chat transcript for each of the plurality of virtual rooms; and wherein the chat transcript for each of the plurality of virtual rooms is displayed to the user in the web conference user interface.

12. The computer system of claim 10, wherein the volume for each of the plurality of virtual rooms below a commonality threshold is muted and the volume for each of the plurality of rooms above the commonality threshold is adjusted according to the commonality score.

13. The computer system of claim 10, wherein providing one or more recommendations to the user further comprises:
displaying, in the web conference user interface, one or more virtual rooms recommended to the user.

14. The computer system of claim 10, further comprising:
updating the topic profile for each of the plurality of virtual rooms in real time;
updating the commonality score between the one or more topics of interest of the user and each updated topic profile for the plurality of virtual rooms; and
providing the user one or more recommendations based on the commonality score update.

15. The computer system of claim 10, further comprising:
determining a commonality overlap between the plurality of virtual rooms;
recommending to the user a merger of at least two or more virtual rooms, wherein the at least two or virtual rooms exceed a commonality overlap threshold; and
merging the two or more virtual rooms.

16. The computer system of claim 10, further comprising:
providing one or more recommendations to the user based on a commonality score between the one or more topics of interest of the user and the topic profile for each of the plurality of virtual rooms.

17. A computer program product for topic monitoring, comprising:
one or more non-transitory computer-readable storage media and program instructions stored on at least one of the one or more tangible storage media, the program instructions executable by a processor to cause the processor to perform a method comprising:
determining a topic profile for each of a plurality of virtual rooms;
displaying, in a web conference user interface, the determined topic profile for each of the plurality of virtual rooms to a user;
identifying one or more topics of interest of the user; and
adjusting, in the web conference user interface, a volume for each of the plurality of virtual rooms, wherein the volume for each of the plurality of virtual rooms is adjusted based on a commonality score between the one or more topics of interest of the user and the topic profile for each of the plurality of virtual rooms.

18. The computer program product of claim 17, further comprising:
updating the topic profile for each of the plurality of virtual rooms in real time;
updating the commonality score between the one or more topics of interest of the user and each updated topic profile for the plurality of virtual rooms; and
providing the user one or more recommendations based on the commonality score update.

19. The computer program product of claim 17, further comprising:
determining a commonality overlap between the plurality of virtual rooms;
recommending to the user a merger of at least two or more virtual rooms, wherein the at least two or virtual rooms exceed a commonality overlap threshold; and
merging the two or more virtual rooms.

20. The computer program product of claim 17, further comprising:
providing one or more recommendations to the user based on a commonality score between the one or more topics of interest of the user and the topic profile for each of the plurality of virtual rooms.

* * * * *